United States Patent
Tao

(10) Patent No.: US 11,611,221 B2
(45) Date of Patent: Mar. 21, 2023

(54) ELECTRONIC DEVICE AND ACCESSORY WITH QUICK CHARGING AND AUDIO TRANSMISSION FUNCTIONS

(71) Applicant: SHANGHAI YAOHUO MICROELECTRONICS Co., Ltd, Shanghai (CN)

(72) Inventor: Hongxia Tao, Shanghai (CN)

(73) Assignee: SHANGHAI YAOHUO MICROELECTRONICS Co., Ltd, Shanghai (CN)

( * ) Notice: Subject to any disclaimer, the term of this patent is extended or adjusted under 35 U.S.C. 154(b) by 0 days.

(21) Appl. No.: 17/295,209

(22) PCT Filed: Nov. 16, 2020

(86) PCT No.: PCT/CN2020/129081
§ 371 (c)(1),
(2) Date: May 19, 2021

(87) PCT Pub. No.: WO2021/135687
PCT Pub. Date: Jul. 8, 2021

(65) Prior Publication Data
US 2022/0360096 A1   Nov. 10, 2022

(30) Foreign Application Priority Data

Dec. 30, 2019   (CN) .......................... 201911388568.4

(51) Int. Cl.
*H02J 7/00* (2006.01)
*G06F 1/26* (2006.01)
(Continued)

(52) U.S. Cl.
CPC .......... *H02J 7/00034* (2020.01); *G06F 1/266* (2013.01); *H02J 7/007* (2013.01); *G06F 3/162* (2013.01); *H01R 31/065* (2013.01)

(58) Field of Classification Search
CPC ....... H02J 7/00034; H02J 7/007; G06F 1/266; G06F 3/162; H01R 31/065
(Continued)

(56) References Cited

U.S. PATENT DOCUMENTS

| 2017/0127203 A1* | 5/2017 | Ryu ......................... H04R 5/04 |
| 2018/0145469 A1* | 5/2018 | Chung ................... H01R 24/62 |
| 2019/0173137 A1* | 6/2019 | Gu ....................... H01M 10/448 |

FOREIGN PATENT DOCUMENTS

| CN | 105656162 A | 6/2016 |
| CN | 106067573 A | 11/2016 |

(Continued)

OTHER PUBLICATIONS

International Search Report of the corresponding PCT Application No. PCT/CN2020/129081 dated Feb. 5, 2021.

*Primary Examiner* — Edward Tso
*Assistant Examiner* — Aaron Piggush
(74) *Attorney, Agent, or Firm* — NZ Carr Law Office PLLC

(57) ABSTRACT

The present invention provides an electronic device and an accessory with quick charging and audio transmission functions. The electronic device can be respectively connected to a charger and an audio connector through the accessory. The electronic device includes a quick charging controller and a device Type-C female socket. The quick charging controller is used for performing quick charging protocol communication by utilizing the SBU pins of the device Type-C female socket and the D+ pin and the D− pin of a charger connected to the accessory when the accessory is connected to the device Type-C female socket and the charger is connected to the accessory. The present invention breaks through the usual thought of using the CC pin to perform quick charging protocol communication in the existing quick charging (Continued)

mode. Further, when the accessory with the audio transmission function is used, the quick charging can also be performed.

16 Claims, 5 Drawing Sheets

(51) Int. Cl.
*G06F 3/16* (2006.01)
*H01R 31/06* (2006.01)

(58) Field of Classification Search
USPC .......................................... 320/107, 114, 163
See application file for complete search history.

(56) References Cited

FOREIGN PATENT DOCUMENTS

| | | |
|---|---|---|
| CN | 206619919 U | 11/2017 |
| CN | 107994627 A | 5/2018 |
| CN | 209298958 U | 8/2019 |
| CN | 110944076 A | 3/2020 |

* cited by examiner

ELECTRONIC DEVICE AND ACCESSORY WITH QUICK CHARGING AND AUDIO TRANSMISSION FUNCTIONS

TECHNICAL FIELD

The present invention relates to a charging field, particularly to an electronic device and an accessory with quick charging and audio transmission functions.

BACKGROUND

In electronic devices such as smart phones, tablets, smart cameras, etc., audio ports (such as 3.5 mm earphone jacks) dedicated to connecting audio connectors are usually omitted for the purpose of reducing the number of external ports and a port-occupying space. Furthermore, both the audio signal transmission function and the charging function need to be implemented using the Type-C port.

However, since the charger and the audio connector cannot be connected at the same time, the audio signal transmission function and the charging function cannot be used at the same time. In this case, an accessory connecting the Type-C male connector to the Type-C female socket and the audio port is needed.

In the related art, after the accessory is connected to the electronic device, it is necessary to use the signal transmission between the CC pin of the Type-C male connector of the accessory and the CC pin of the Type-C female socket of the electronic device to determine whether the accessory is connected to the audio connector and/or the charger.

However, in electronic devices, the quick charging protocol communication is usually implemented using the CC pin. When the CC pin has been already used, the quick charging protocol communication cannot be performed. It can be seen that quick charging cannot be performed when using an accessory with charging and audio transmission functions.

SUMMARY

The present invention provides an electronic device and an accessory with quick charging and audio transmission functions, so as to solve the problem that quick charging cannot be performed when using an accessory with both charging and audio transmission functions.

According to a first aspect of the present invention, an electronic device is provided. The electronic device is respectively connected a charger and an audio connector through an accessory. The electronic device includes: a quick charging controller and a device Type-C female socket;

the quick charging controller is configured to perform quick charging protocol communication through SBU pins of the device Type-C female socket and a corresponding pin of the charger connected to the accessory when the accessory is connected to the device Type-C female socket and the charger is connected to the accessory.

In an embodiment of the present invention, the SBU pins of the device Type-C female socket are connected to the quick charging controller through a switching combination.

In an embodiment of the present invention, two SBU pins of the device Type-C female socket include a SBU1 pin and a SBU2 pin, the SBU1 pin and the SBU2 pin of the device Type-C female socket are connected to a side of the switching combination, and a first data pin and a second data pin of the quick charging controller are connected to another side of the switching combination;

the switching combination is configured to switch the connection mode between the device Type-C female socket and the quick charging controller as follows:

connect the SBU1 pin of the device Type-C female socket to the first data pin and connect the SBU2 pin of the device Type-C female socket to the second data pin; or connect the SBU1 pin of the device Type-C female socket to the second data pin and connect the SBU2 pin of the device Type-C female socket to the first data pin.

In an embodiment of the present invention, the electronic device further includes a processor. The DP pin and the DM pin of the device Type-C female socket are respectively connected to the DP pin and the DM pin of an accessory Type-C male connector of the accessory when the accessory is connected to the device Type-C female socket;

the processor is directly or indirectly connected to a DP pin and a DM pin of the device Type-C female socket, so as to uses digital audio signals to interact with the accessory, and the digital audio signals match analog audio signals that the accessory interacts with the audio connector.

In an embodiment of the present invention, a side of the switching combination is respectively connected to the DP pin and the DM pin of the device Type-C female socket, and another side of the switching combination is connected to digital signal pins of the processor for receiving USB 2.0 digital signals;

the switching combination is configured to:

switch the DP pin of the device Type-C female socket to connect to the quick charging controller or the processor;

switch the DM pin of the device Type-C female socket to connect to the quick charging controller or the processor.

In an embodiment of the present invention, the electronic device further includes a current source and a voltage detection module, and the current source is connected to the SBU pin of the device Type-C female socket through the switching combination and configured to output an current to the SBU pin;

the voltage detection module is directly or indirectly connected to SBU pins of the device Type-C female socket, and the voltage detection module detects voltage information across the SBU pins to determine impedances of SBU pins of the device Type-C female socket based on the voltage information.

In an embodiment of the present invention, the electronic device further includes a power management module connected to the VBUS pin of the device Type-C female socket;

when the accessory is connected to the device Type-C female socket, the CC pin of the device Type-C female socket is connected to a CC pin of an accessory Type-C male connector of the accessory; the CC pin of the device Type-C female socket is connected to a processor, and the processor is configured to determine external connecting states of the accessory according to a signal of the CC pin of the device Type-C female socket; the external connecting states include a first connecting state that the accessory is connected to the audio connector rather than the charger, and a second connecting state that the accessory is connected to the charger;

when the external connecting state is the first connecting state, the processor is configured to command that the power management module provides power for the accessory through the VBUS pin of the device Type-C female socket;

when the external connecting state is the second connecting state, the processor is configured to command that the power management module is charged through the VBUS pin of the device Type-C female socket.

According to a second aspect of the present invention, an accessory with quick charging and audio transmission functions is provided. The accessory includes an accessory Type-C female socket connected to a charger, an accessory Type-C male connector, and an audio port connected to an audio connector, and the accessory Type-C male connector is connected to the device Type-C female socket of the electronic device of the first aspect and the related embodiments.

In an embodiment of the present invention, SBU pins of the accessory Type-C male connector include a SBU1 pin and a SBU2 pin;

the SBU1 pin and the SBU2 pin of the accessory Type-C male connector are respectively connected to the DP pin and the DM pin of the accessory Type-C female socket, and when the charger is connected to the accessory Type-C female socket, the DP pin and the DM pin of the accessory Type-C female socket are respectively connected to the D+ pin and the D− pin of the charger; or the SBU1 pin and the SBU2 pin of the accessory Type-C male connector are respectively connected to the SBU1 pin and the SBU2 pin of the accessory Type-C female socket, and when the charger is connected to the accessory Type-C female socket, the SBU1 pin and the SBU2 pin of the accessory Type-C female socket are respectively connected to the SBU1 pin and the SBU2 pin of the charger.

In an embodiment of the present invention, the accessory further includes an audio processing module with three signal transmission pins thereof respectively connected to a left channel, a right channel, and a microphone pin of the audio port, and the audio processing module is connected to the DP pin and the DM pin of the accessory Type-C male connector;

the audio processing module is configured to:

use digital audio signals to interact with the connected electronic device through the DP pin and the DM pin of the accessory Type-C male connector;

use analog audio signals to interact with the audio connector through the three signal transmission pins; and perform a conversion between the digital audio signal and the analog audio signal.

In an embodiment of the present invention, the first detection pin and the second detection pin of the audio processing module are connected to the audio port, the first detection pin is shorted to the second detection pin when the audio connector is completely connected to the audio port, and the first detection pin is connected to the CC pin of the accessory Type-C male connector;

when the audio connector is completely connected to the audio port but the charger is not connected to the accessory Type-C female socket, the first detection pin is shorted to the second detection pin and the voltage level of the CC pin of the accessory Type-C male connector is pulled to a first voltage level, which commands that the electronic device connected to the accessory directly or indirectly provides power for the audio processing module;

when the charger is connected to the accessory Type-C female socket, the audio processing module is charged by the charger.

In an embodiment of the present invention, the accessory further includes a control module with a power supplying pin thereof connected to the VBUS pin of the accessory Type-C female socket, and the control module is charged by the charger when the charger is connected to the accessory Type-C female socket;

when the charger is connected to the accessory Type-C female socket, the control module is configured to pull the voltage of the CC pin of the accessory Type-C male connector to a second voltage level, which commands that the electronic device connected to the accessory is charged through the VBUS pin of the electronic device.

In an embodiment of the present invention, the accessory further includes a first switch, a second switch, a third switch, a fourth switch, and a low dropout regulator;

the first switch is connected between the first detection pin and the second detection pin, the first switch is turned on when the audio connector is completely connected to the audio port, the second switch is connected between the second detection pin and the ground and connected to a resistor unit in parallel, the third switch is connected between VBUS pins of the accessory Type-C female socket and the accessory Type-C male connector, the CC pin of the accessory Type-C male connector is connected to the VBUS pin of the accessory Type-C male connector through the fourth switch and a resistor unit, and the VBUS pin of the accessory Type-C male connector provides power for the audio processing module through the low dropout regulator;

when the voltage of the CC pin of the accessory Type-C male connector is pulled to a second voltage level, the control module is configured to turn off the second switch and turn on the third switch and the fourth switch.

In an embodiment of the present invention, when the quick charging controller performs quick charging communication through the VBUS pin of the device Type-C female socket, the charger connected to the accessory needs to support the ability of performing quick charging communication through the VBUS pin. The accessory only needs to be responsible for the connection of the VBUS pin from the female socket to the male connector.

The present invention provides an electronic device and an accessory with quick charging and audio transmission functions. The electronic device can perform quick charging protocol communication through the SBU pin of the device Type-C female socket and the D+ pin and the D-pin of the charger, which breaks through the usual thought of using the CC pin to perform quick charging protocol communication in the existing quick charging mode. Further, when the accessory with the audio transmission function is used, quick charging can also be performed. In an embodiment, through the interaction of digital audio signals, the required pins can be saved to guarantee the use of the SBU pins for quick charging protocol communication.

BRIEF DESCRIPTION OF THE DRAWINGS

Below, the embodiments are described in detail in cooperation with the drawings to make easily understood the technical contents, characteristics and accomplishments of the present invention. Obviously, the drawings in the following description are only some embodiments of the present invention. For those of ordinary skill in the art, other drawings can be obtained based on these drawings without creative labor.

DESCRIPTION OF REFERENCE NUMERALS

1—electronic device;
11—device Type-C female socket;
12—quick charging controller;
13—switching combination;
14—processor;
15—power management module;
16—audio encoder;
2—accessory;
21—accessory Type-C male connector;
22—audio port;
23—accessory Type-C female socket;
24—audio processing module;
25—control module;
26—modulation module;
3—audio connector;
4—charger;
S1—first switch;
S2—second switch;
S3—third switch;
S4, S5—fourth switch;
S6—first toggle switch;
S7—second toggle switch;
S8—third toggle switch;
S9—fourth toggle switch;
LDO—low dropout regulator;
R1, R2, R3, R4, R5, R6—resistor.

DETAILED DESCRIPTION OF THE EMBODIMENTS

The technical implementations in the embodiments of the present invention will be clearly and completely described below in cooperation with the accompanying drawings in the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

The terms "first", "second", "third", "fourth", etc. (if any) in the description and claims of the present invention and the above-mentioned drawings are used to distinguish similar objects, but not necessarily describe a specific order. It should be understood that the data used in this way can be interchanged under appropriate circumstances so that the embodiments of the present invention described herein can be implemented in a sequence other than those illustrated or described herein. In addition, the terms "include" and "have" and any variations of them are intended to cover non-exclusive inclusion. For example, a process, method, system, product or device that includes a series of steps or units is not necessarily limited to the clearly listed steps or units. Those steps or units may include other steps or units that are not clearly listed or are inherent to these processes, methods, products, or equipment.

The technical implementation of the present invention will be described in detail below with specific embodiments. The following specific embodiments can be combined with each other, and the same or similar concepts or processes may not be repeated in some embodiments.

Figure 1:
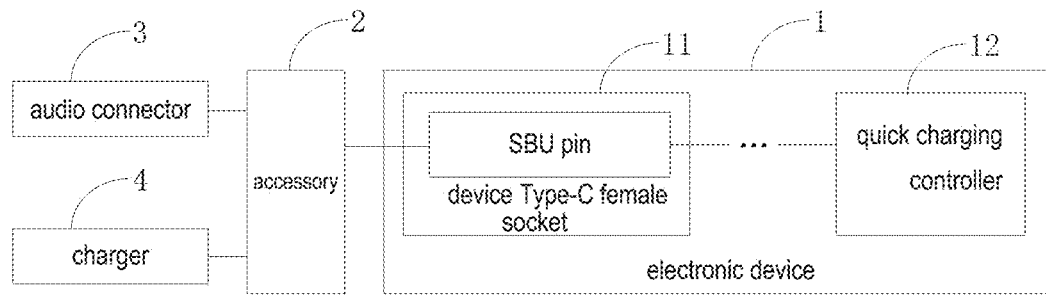
FIG. 1 is a schematic diagram 1 illustrating the structure of an electronic device according to an embodiment of the present invention.

Referring to FIG. 1, the electronic device 1 is respectively connected a charger 4 and an audio connector 3 through an accessory 2. The electronic device 1 includes a quick charging controller 12 and a device Type-C female socket 11.

The quick charging controller 12 may be a circuit that can perform quick charging protocol communication, such as a MCU, an ASIC, or a quick charging module of an integrated chip.

The MCU specifically refers to the Microcontroller Unit, such as a micro control unit, a microcontroller, a microprocessor, etc. The ASIC specifically refers to the Application Specific Integrated Circuit, namely a dedicated integrated circuit.

In the embodiment, the quick charging controller 12 is configured to perform quick charging protocol communication by utilizing the SBU pins or the VBUS pin of the device Type-C female socket 11 and the corresponding pin of the charger connected to the accessory (e.g., between the SUB1/SBU2 pin of the device Type-C female socket 11 and the D+/D− pin of the charger, or between the SUB1/SBU2 pin of the device Type-C female socket 11 and the SBU1/SBU2 pin of charger, or between the VBUS pins of the device Type-C female socket 11 and the charger) when the accessory 2 is connected to the device Type-C female socket 11 and the charger 4 is connected to the accessory 2.

The specific method of quick protocol communication can be any interactive means for quick charging in the field, namely any quick charging protocol communication. The existing method or the improved method, implemented through the SBU pin or the VBUS pin of the device Type-C female socket 11, is to be included within the scope of the embodiment.

Figure 9:
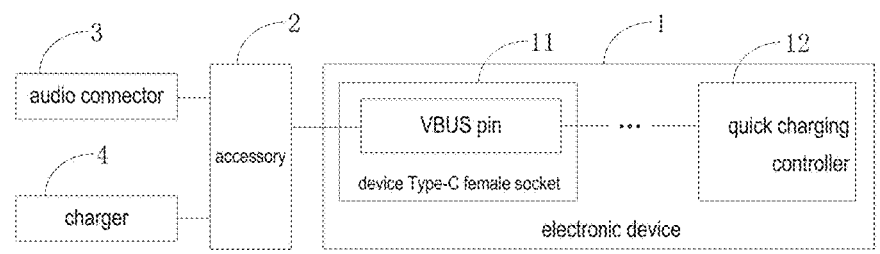
FIG. 9 is a schematic diagram illustrating the structure of an electronic device according to another embodiment of the present invention.
Figure 10:
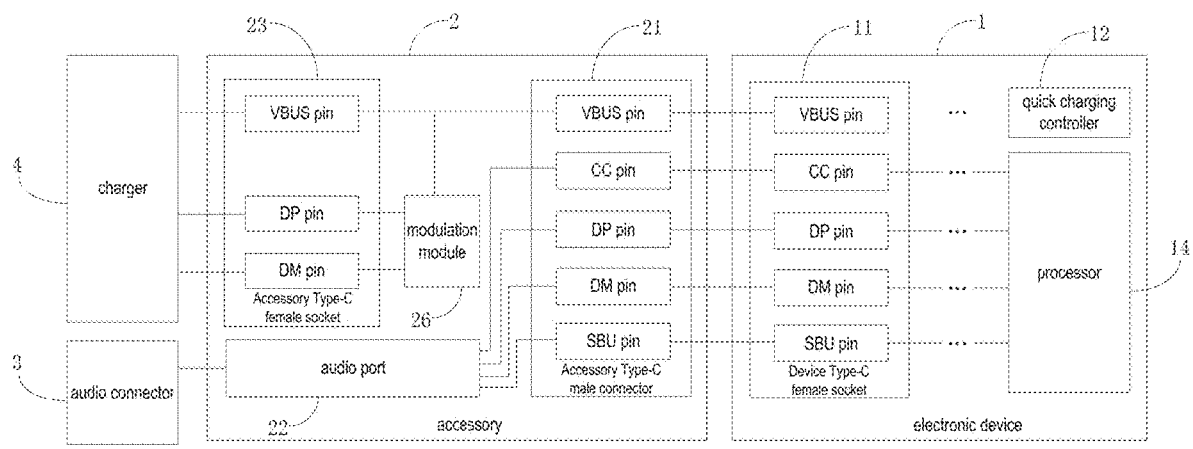
FIG. 10 is a schematic diagram illustrating the structures of an accessory and an electronic device according to another embodiment of the present invention.
Figure 11:
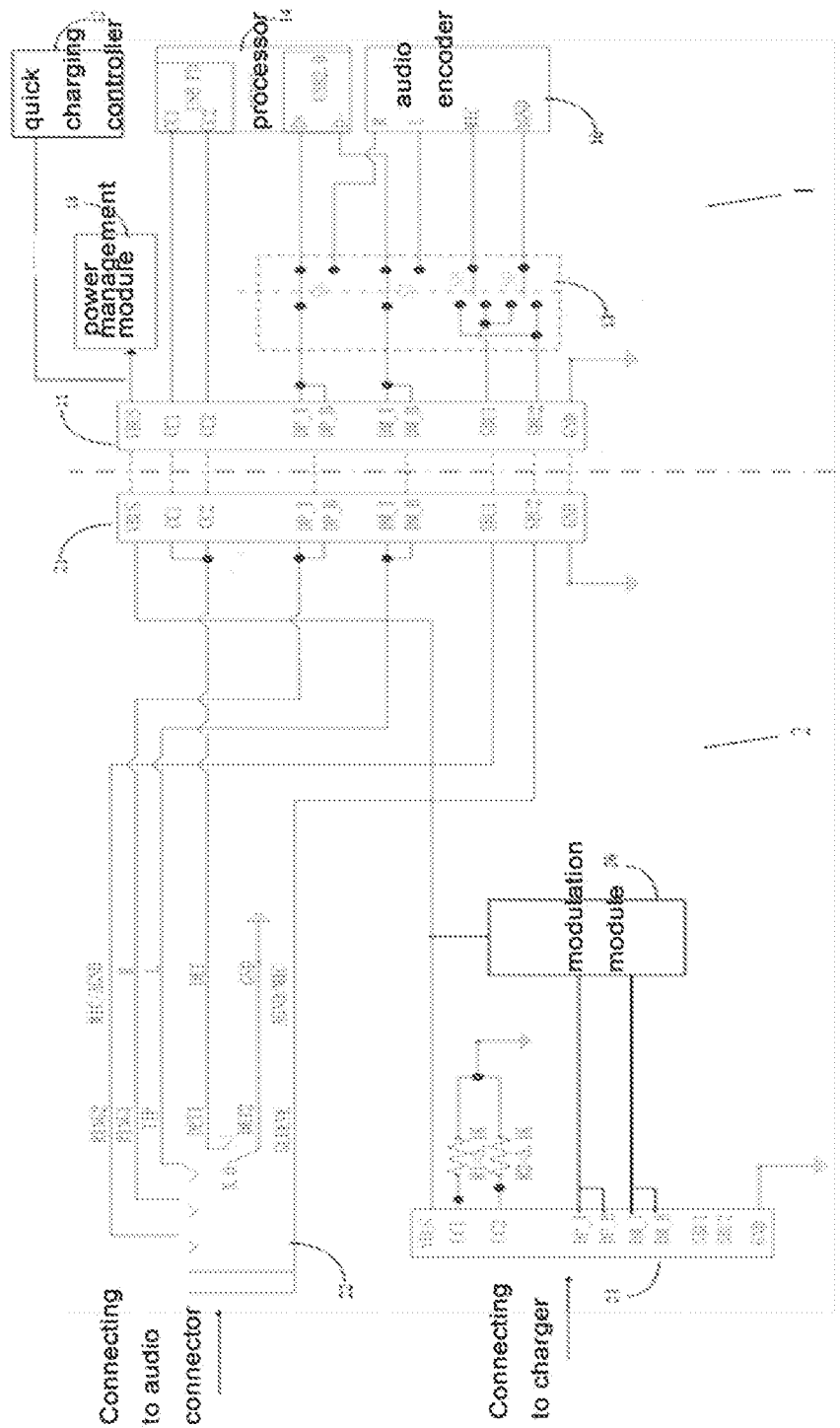
FIG. 11 is a schematic diagram illustrating the circuits of an accessory and an electronic device according to another embodiment of the present invention.

The quick charging controller 12 performs quick protocol communication through the SBU pins of the device Type-C female socket 11, as illustrated in FIGS. 1-8. Alternatively, the quick charging controller 12 performs quick protocol communication through the VBUS pin of the device Type-C female socket 11, as illustrated in FIGS. 9-11.

In the foregoing implementation, quick protocol communication is performed through the SBU pins or the VBUS pin of the device Type-C female socket and the D+ pin and the D− pin of the charger. This breaks through the usual thought of using the CC pin to perform quick charging protocol communication in the existing quick charging mode. Further, when the accessory with the audio transmission function is used, the quick charging can also be performed.

Figure 2:
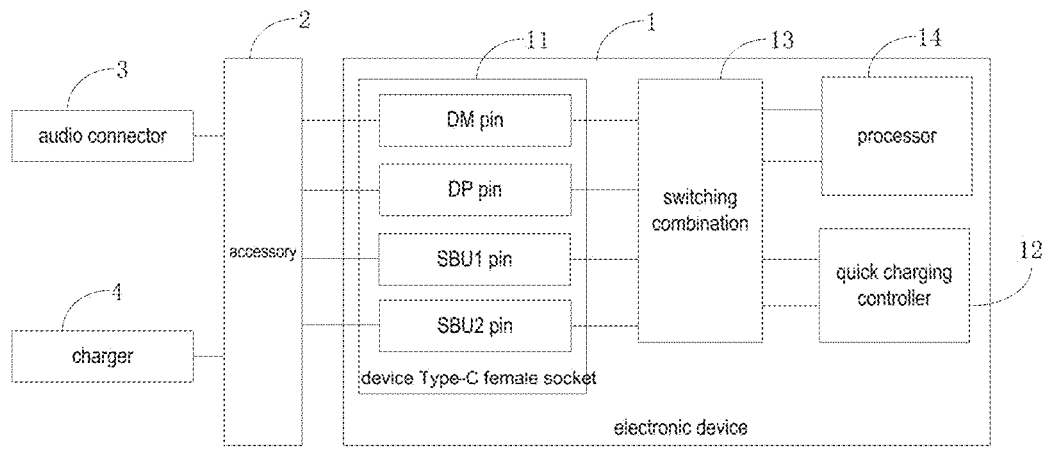
FIG. 2 is a schematic diagram 2 illustrating the structure of an electronic device according to an embodiment of the present invention.

Refer to FIG. 2. In an embodiment, when the quick charging controller 12 performs quick charging protocol communication through the SBU pins of the device Type-C female socket 11, the SBU pins of the device Type-C female socket 11 are connected to the quick charging controller 12 through a switching combination 13. When quick charging protocol communication is required, the switching combination 13 can control on and off to satisfy the requirement for communication.

Specifically, two SBU pins of the device Type-C female socket 11 include a SBU1 pin and a SBU2 pin. The SBU1 pin and the SBU2 pin of the device Type-C female socket are connected to a side of the switching combination 13, and the first data pin and the second data pin of the quick charging controller 12 are connected to another side of the switching combination.

The switching combination 13 is configured to:

switch the connection mode between the device Type-C female socket 11 and the quick charging controller 12 to:

connect the SBU1 pin of the device Type-C female socket to the first data pin and connect the SBU2 pin of the device Type-C female socket to the second data pin; or connect the SBU1 pin of the device Type-C female socket to the second data pin and connect the SBU2 pin of the device Type-C female socket to the first data pin.

Figure 8:
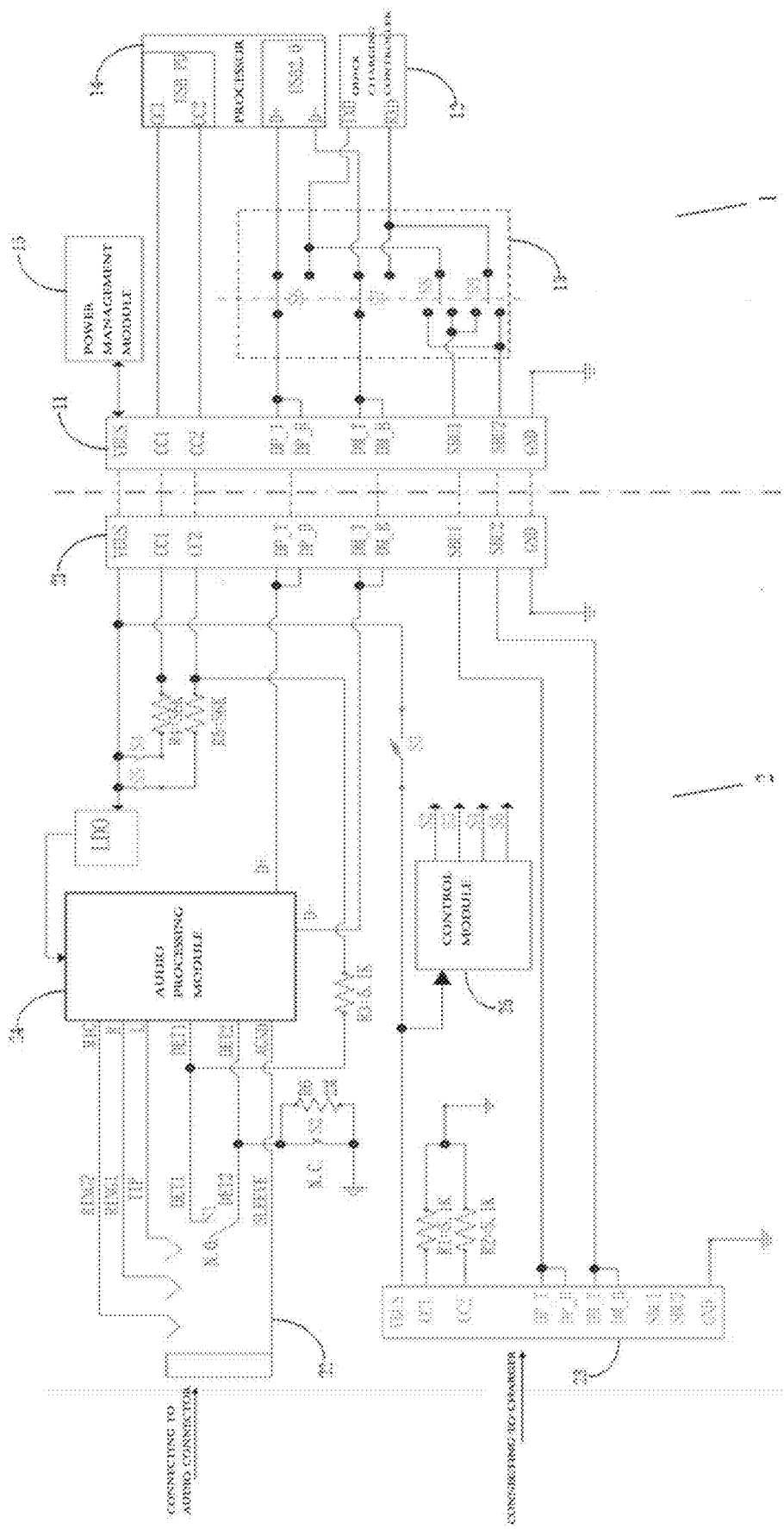
FIG. 8 is a schematic diagram illustrating the circuits of an accessory and an electronic device according to an embodiment of the present invention.

In an example, as illustrated in FIG. 8, the first data pin and the second data pin may be a RXD pin for receiving signals and a TXD pin for outputting signals. In other examples, the first data pin and the second data pin may be two general-purpose input/output (GPIO) pins, serial data (SDA) pins, or serial clock (SCL) pins.

In the case of utilizing the SBU pins for quick charging protocol communication, the SBU pins of the accessory Type-C male connector is also used. At this time, the SBU pins of the accessory Type-C male connector cannot be used to transmit audio related signals. In the accessory, if the analog audio signal is used for transmission, audio transmission and quick charging protocol communication will require more pins to implement. As a result, the number of pins may be insufficient. If the digital audio signal is used for transmission, audio transmission and quick charging protocol communication are performed through fewer pins.

In an embodiment, the DP pin and the DM pin of the device Type-C female socket are respectively connected to the DP pin and the DM pin of the accessory Type-C male connector of the accessory when the accessory is connected to the device Type-C female socket. Further, the audio digital signals may interact with each other through the DM pin and the DP pin.

The electronic device further includes a processor 14.

The processor 14 is directly or indirectly connected to the DP pin and the DM pin of the device Type-C female socket 11. The processor 14 uses digital audio signals to interact with the accessory through the DP pin and the DM pin of the device Type-C female socket 11.

The digital audio signals match analog audio signals that the accessory interacts with the audio connector. The specific implementation of the audio digital signal for the accessory can be elaborated as follows.

Through these channels, the interaction of digital audio signals can be implemented. The processor can send out digital audio signals generated and processed by an internal circuit, and also receive digital audio signals transmitted from accessory. As illustrated in FIG. 8, the processor can send out and receive digital audio signals through digital signal pins for receiving USB2.0 digital signals. The digital signal pins include a D+ pin and a D− pin. The D+ pin is connected to the DP pin. The D− pin is connected to the DM pin.

The DM pin and the DP pin may not be dedicated to the communication of digital audio signals. Further, the DM pin and the DP pin need to be switched in a time-sharing way.

In a specific implementation, a side of the switching combination 13 is respectively connected to the DP pin and the DM pin of the device Type-C female socket 11 and another side of the switching combination 13 is connected to the digital signal pins of the processor 14 for receiving USB 2.0 digital signals.

The switching combination 13 is configured to:

switch the DP pin of the device Type-C female socket to connect to the quick charging controller or the processor; and switch the DM pin of the device Type-C female socket to connect to the quick charging controller or the processor.

As a result, through the foregoing process, the pins can communicate with the external device in a time-sharing way. For example, the pins can communicate with the audio connector or the charger separately.

In a specific implementation, the DM pin, DP pin, SBU1 pin, and SBU2 pin of the device Type-C female socket can be respectively connected to one or two contacts of the first side of the switching combination. The D+ pin and D− pin of the processor for USB2.0 digital signal and the TXD pin and RXD pin of the quick charging controller 12 can be respectively connected to one or two contacts of the switching combination. The switching combination 13 can perform the foregoing various switching functions by switching the conductive contacts. Any switching combination that can perform the foregoing switching functions is to be also included within the scope of the embodiment.

In an example of FIG. 8, the switching combination 13 may include a first switch S6, a second switch S7, a third switch S8, and a fourth switch S9.

The features of the first switch S6 and the second switch S7 are specifically described as follows:

The first contact of the first side of the first switch S6 is connected to the DP pin of the device Type-C female socket 11. The second contact of the second side of the first switch S6 is connected to the D+ pin of the processor 14 for USB2.0 digital signals. The third contact of the second side of the first switch S6 is connected to the TXD pin of the quick charging controller 12. When the first contact of the first switch S6 is switched to conduct the second contact, the DP pin of the device Type-C female socket 11 is connected to the D+ pin of the processor 14. When the first contact of the first switch S6 is switched to conduct the third contact, the DP pin of the device Type-C female socket 11 is connected to the TXD pin of the quick charging controller 12.

The first contact of the first side of the second switch S7 is connected to the DM pin of the device Type-C female socket 11. The second contact of the second side of the second switch S7 is connected to the D− pin of the processor 12 for USB2.0 digital signals. The third contact of the second side of the second switch S7 is connected to the RXD pin of the quick charging controller 12. When the first contact of the second switch S7 is switched to conduct the second contact, the DM pin of the device Type-C female socket 11 is connected to the D pin of the processor 14. When the first contact of the second switch S7 is switched to conduct the third contact, the DM pin of the device Type-C female socket 11 is connected to the RXD pin of the quick charging controller 12.

Thus, the first switch S6 and the second switch S7 may form a two-way single-pole double-throw switch.

The features of the third switch S8 and the fourth switch S9 are specifically described as follows:

The first contact of the first side of the third switch S8 is connected to the SBU1 pin of the device Type-C female socket 11. The second contact of the third switch S8 is connected to the SBU2 pin of the device Type-C female socket 11. The third contact of the second side of the third switch S8 is connected to the TXD pin of the quick charging controller 12. When the first contact of the third switch S8 is switched to conduct the third contact, the SBU1 pin of the device Type-C female socket 11 is connected to the TXD pin of the quick charging controller 12. When the second contact of the third switch S8 is switched to conduct the third contact, the SBU2 pin of the device Type-C female socket 11 is connected to the TXD pin of the quick charging controller 12.

The first contact of the first side of the fourth switch S9 is connected to the SBU1 pin of the device Type-C female socket 11. The second contact of the fourth switch S9 is connected to the SBU2 pin of the device Type-C female socket 11. The third contact of the second side of the fourth switch S9 is connected to the RXD pin of the quick charging controller 12. When the first contact of the fourth switch S9 is switched to conduct the third contact, the SBU1 pin of the device Type-C female socket 11 is connected to the RXD pin of the quick charging controller 12. When the second contact of the fourth switch S9 is switched to conduct the third contact, the SBU2 pin of the device Type-C female socket 11 is connected to the RXD pin of the quick charging controller 12.

It can be seen that in the structure illustrated in FIG. 8, the third switch S8 and the fourth switch S9 can form the required connection channel in a cross-connect or non-cross-connect way.

In the structure illustrated in FIG. 8, each of the first switch S6 and the second switch S7 is provided with one contact at the first side and two contacts at the second side. In other examples, each of the first switch S6 and the second switch S7 is provided with two contacts at the first side and one contact at the second side. Similarly, in the structure illustrated in FIG. 9, each of the third switch S8 and the fourth switch S9 is provided with two contacts at the first side and one contact at the second side. In other examples, each of the third switch S8 and the fourth switch S9 is provided with one contact at the first side and two contacts at the second side. In addition, the switches may share a part of contacts.

In an embodiment, the electronic device further includes a current source and a voltage detection module in order to utilize the switching combination 13. The current source is connected to SBU pins of the device Type-C female socket through the switching combination and configured to output current to the SBU pins.

The voltage detection module is directly or indirectly connected to SBU pins of the device Type-C female socket 11. The voltage detection module detects voltage information across the SBU pins to determine impedances of SBU pins of the device Type-C female socket 11 based on the voltage information. For example, the voltage detection module may be connected to the processor. The voltage detection module feeds back voltage information to the processor so that the processor can determine the impedances of the SBU1 and SBU2 pins of the device Type-C female socket.

In addition, the current source can be connected to the SBU pin by utilizing a switch except the foregoing switches or by combining the switching combination 13. For example, the current source is connected to the third contact of the third switch S8 and/or the fourth switch S9.

In the foregoing embodiments, after the charger and accessory are connected, the values of the pull-down resistances of the D+ and D– pins of the charger or the short-circuit state between D+ and D– pins can be detected and determined, so that the charger and the charging circuit make preparations for quick charging protocol before communication happens.

Figure 3:
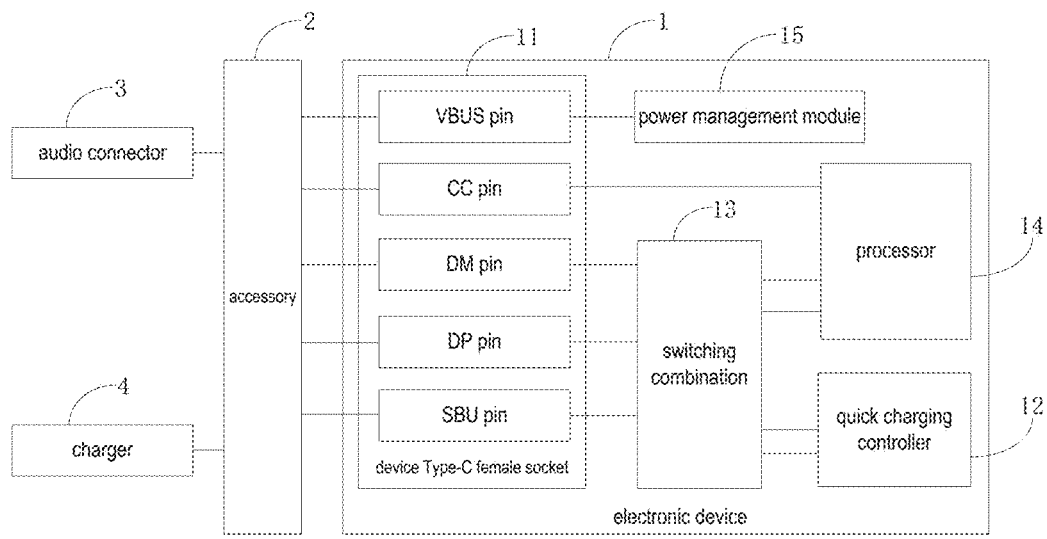
FIG. 3 is a schematic diagram 3 illustrating the structure of an electronic device according to an embodiment of the present invention.

Refer to FIG. 3. In an embodiment, the electronic device 1 may further include a power management module 15 connected to the VBUS pin of the device Type-C female socket 11.

When the accessory 2 is connected to the device Type-C female socket 11, the CC pin of the device Type-C female socket 11 is connected to the CC pin of the accessory Type-C male connector of the accessory 2. The CC pin of the device Type-C female socket is connected to a processor 14. The processor 14 is configured to determine external connecting states of the accessory according to the signal of the CC pin of the device Type-C female socket 11.

The external connecting states may include a first connecting state that the accessory is connected to the audio connector rather than the charger, and a second connecting state that the accessory is connected to the charger.

When the external connecting state is the first connecting state, the processor 14 is further configured to command that the power management module 15 provides power for the accessory through the VBUS pin of the device Type-C female socket 11.

When the external connecting state is the second connecting state, the processor 14 is configured to command that the power management module 15 is charged through the VBUS pin of the device Type-C female socket 11.

In addition, the external connecting states may further include, for example, a third connecting state that the audio connector 3 and the charger 4 are not connected and a fourth connecting state that the charger 4 is connected but the audio connector 3 is not connected.

The power management module 15 may be connected to the processor 14 and the VBUS pin of the device Type-C female socket 11, respectively. Besides, the processor 14 may be connected to the CC pin of the device Type-C female socket 11 through the CC pin of the USB PD module.

The word "CC" of the CC pin specifically denotes the Configuration Channel, which can be understood as the configuration channel of the Type-C port. The configuration channel is usually used to support identification of USB devices and cables and the related communication determination.

The power management module 15 can be represented as Power Management, which can be understood as a circuit module connecting to the power supply of the electronic device and controlling the input and output of the power supply. The power management module 15 may be independent of the processor 14 and/or the quick charging controller 12. Alternatively, the power management module 15 may be integrated in the processor 14 and/or the quick charging controller 12.

Figure 4:
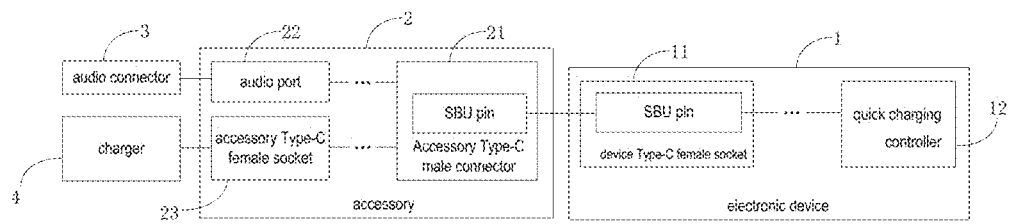
FIG. 4 is a schematic diagram 1 illustrating the structures of an accessory and an electronic device according to an embodiment of the present invention.

Referring to FIG. 4, the embodiment further provides an accessory 2 with quick charging and audio transmission functions. The accessory 2 includes an accessory Type-C female socket 23 connected to a charger 4, an accessory Type-C male connector 21, and an audio port 22 connected to an audio connector 22. The accessory Type-C male connector 21 is connected to the device Type-C female socket 11 of the electronic device 1 of the foregoing implementation.

The SBU pins of the accessory Type-C male connector 21 can be connected to the SUB pins of the Type-C female socket. Specifically, the SBU1 pin of the accessory Type-C male connector 21 can be connected to the SUB1 pin of the Type-C female socket. The SBU2 pin of the accessory Type-C male connector 21 can be connected to the SUB2 pin of the Type-C female socket.

Any accessory that can cooperate with an electronic device to perform quick charging protocol communication through the SBU pins of the device Type-C female socket is to be also included within the scope of the embodiment.

In order to perform quick charging protocol communication, the SBU1 pin and the SBU2 pin of the accessory Type-C male connector 21 are connected to the D+ pin and the D- pin of the charger.

Figure 5:
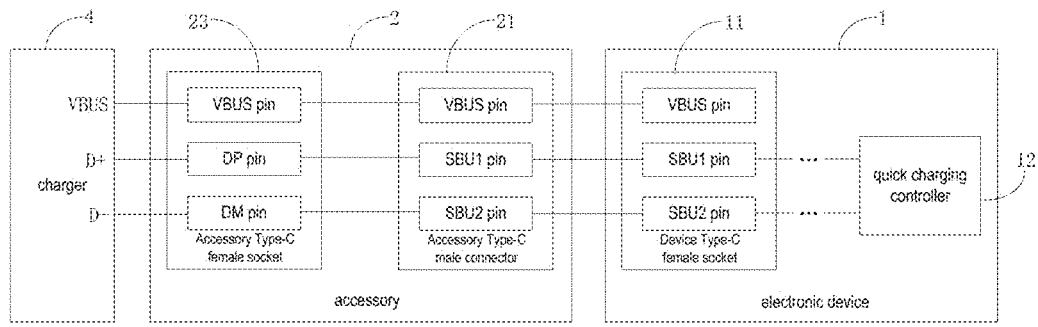
FIG. 5 is a schematic diagram 2 illustrating the structures of an accessory and an electronic device according to an embodiment of the present invention.

In an example, as illustrated FIG. 5, the SBU1 pin and the SBU2 pin of the accessory Type-C male connector 21 are respectively connected to the DP pin and the DM pin of the accessory Type-C female socket 23.

When the charger 4 is connected to the accessory Type-C female socket 23, the DP pin and the DM pin of the accessory Type-C female socket 23 are respectively connected to the D+ pin and the D- pin of the charger.

Figure 6:
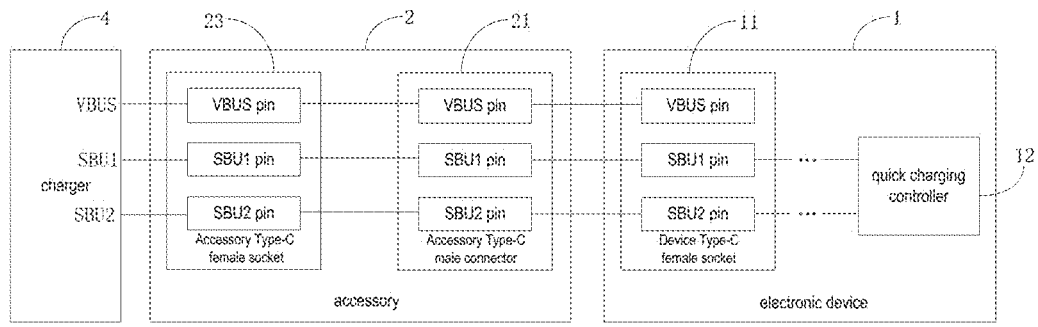
FIG. 6 is a schematic diagram 3 illustrating the structures of an accessory and an electronic device according to an embodiment of the present invention.

In another example, as illustrated in FIG. 6, the SBU1 pin and the SBU2 pin of the accessory Type-C male connector 21 are respectively connected to the SBU1 pin and the SBU2 pin of the accessory Type-C female socket 23. When the charger 4 is connected to the accessory Type-C female socket 23, the SBU1 pin and the SBU2 pin of the accessory Type-C female socket 23 are respectively connected to the SBUE1 pin and the SBU2 pin of the charger 4.

In an embodiment, the audio signals implemented with analog audio signals can be transmitted in the accessory, so as to interact with the electronic device.

Figure 7:
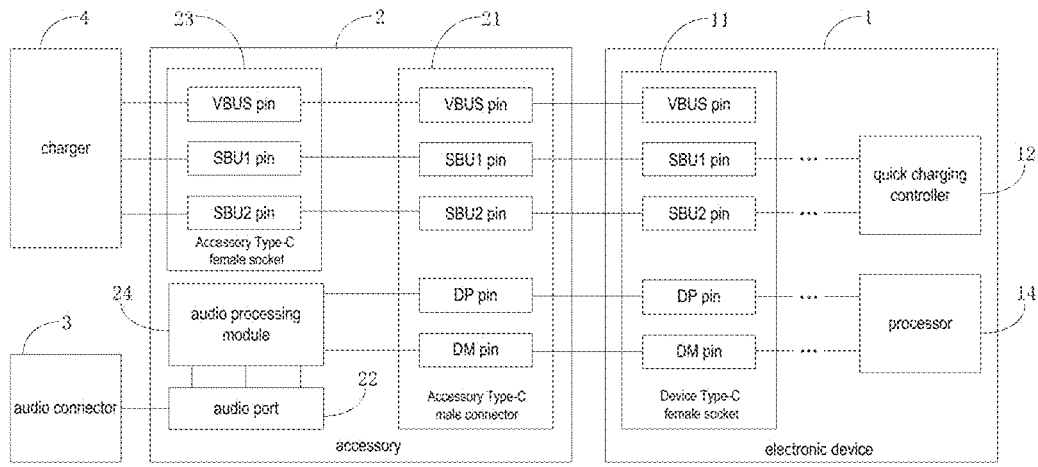
FIG. 7 is a schematic diagram 4 illustrating the structures of an accessory and an electronic device according to an embodiment of the present invention.

In another embodiment, digital audio signals are used to interact with the electronic device referring to FIG. 7.

Referring to FIG. 7, the accessory 2 further includes an audio processing module 24.

The audio processing module 24 is represented as an Audio ASIC that can be a circuit module capable of performing analog-to-digital and digital-to-analog conversion on analog audio signals.

The three signal transmission pins of the audio processing module 24 are respectively connected to the left channel, the right channel, and the microphone pin of the audio port. The audio processing module 24 is connected to the DP pin and the DM pin of the accessory Type-C male connector 21.

The audio processing module 24 is configured to:

use digital audio signals to interact with the connected electronic device 1 through the DP pin and the DM pin of the accessory Type-C male connector; specifically interact with the DP pin and the DM pin of the device Type-C female socket 11;

use analog audio signals to interact with the audio connector 3 through the three signal transmission pins; and perform a conversion between the digital audio signal and the analog audio signal.

In a specific implementation, the audio processing module 24 can cooperate with the energy storing component in the accessory to provide power. Alternatively, the audio processing module 24 can cooperate with the electronic device 1 and the charger 4 to provide power. Thus, the charger 4 provides power when the charger 4 is connected. The electronic device 1 provides power when the electronic device 1 is connected.

The first detection pin and the second detection pin of the audio processing module 24 are connected to the audio port. The first detection pin is shorted to the second detection pin when the audio connector is completely connected to the audio port. The first detection pin is connected to the CC pin of the accessory Type-C male connector. For example, the two detection pins may be DET1 pin and DET2 pin in FIG. 8.

When the audio connector 3 is completely connected to the audio port 23 but the charger 4 is not connected to the accessory Type-C female socket 23, the first detection pin is shorted to the second detection pin and the voltage level of the CC pin of the accessory Type-C male connector 21 is pulled to a first voltage level, which commands that the electronic device connected to the accessory directly or indirectly provides power for the audio processing module. Take FIG. 8 as an example. Since the pin DET 1 is shorted to the pin DET 2, the voltage levels of the pins DET 1 and DET 2 are pulled down when the second switch S2 is turned on. Since the pin DET 1 is connected to the CC pin through a resistor, the voltage level of the CC pin may be also pulled down. In other examples, the implementation of pulling up these voltage levels is not excluded.

When the charger 4 is connected to the accessory Type-C female socket 23, the audio processing module 24 is charged by the charger.

In order to switch the different power supplying modes of the audio processing module 24 in different external connecting states of the accessory, the accessory 2 further includes a control module 25 in FIG. 8. The control module 25 can be an existing control module in the accessory or a control module additionally arranged.

The power supplying pin of the control module connected to the VBUS pin of the accessory Type-C female socket 23. The control module is charged by the charger 4 when the charger 4 is connected to the accessory Type-C female socket 23.

When the charger 4 is connected to the accessory Type-C female socket 23, the control module 25 is configured to pull the voltage of the CC pin of the accessory Type-C male connector 21 to a second voltage level, which commands that the electronic device connected to the accessory is charged through the VBUS pin of the electronic device. In the example illustrated in FIG. 8, the second level may be a pull-up level. In other examples, the second level may also be a pull-down level.

In the foregoing implementation, after the voltage level of the CC pin of the accessory Type-C male connecter 21 is pulled to the corresponding voltage level, the voltage level of the CC pin of the electronic device 1 can also be pulled to the corresponding voltage level, so that the processor can obtain the external connecting state of the accessory, so as to control the power management module 15 according to the content mentioned above.

Take FIG. 8 as an example. In order to perform the control process of the control module 25, the accessory 2 may further include a first switch S1, a second switch S2, a third switch S3, a fourth switch S4, and a low-dropout regulator (LDO).

The first switch S1 is connected between the first detection pin and the second detection pin. The first switch S1 is turned on when the audio connector 3 is completely connected to the audio port 22. The second switch S2 is connected between the second detection pin and the ground and connected to a resistor unit in parallel. The resistor unit includes, for example, a resistor R6 illustrated in FIG. 8. The third switch S3 is connected between VBUS pins of the accessory Type-C female socket 23 and the accessory Type-C male connector 21. The CC pin of the accessory Type-C male connector 21 is connected to the VBUS pin of the accessory Type-C male connector 21 through the fourth switch S4 and a resistor unit. The resistor unit includes, for example, a resistor R3 illustrated in FIG. 8. The VBUS pin of the accessory Type-C male connector 21 provides power for the audio processing module 24 through the low dropout regulator.

When the voltage of the CC pin of the accessory Type-C male connector is pulled to a second voltage level, the control module 25 is configured to turn off the second switch S2 and turn on the third switch S3 and the fourth switch S4.

The operating principle of FIG. 8 is described as follows and exemplified based on the electronic device and the accessory.

For example, after the audio connector such as the earphone jack is inserted into the audio port of the 3.5 mm earphone jack, the first switch S1 can be closed. The audio port can be connected to a normally closed (NC) second switch S2 and a resistor R6 connected to the second switch S2 in parallel. The resistance of the resistor R6 can be 2 M ohms or other larger values. Through the resistor R6, it can be ensured that the voltage of the pin DET2 of the audio processing module 24 is pulled to a low level logic when the first switch S1 and the second switch S2 are both disconnected. Thus, the audio processing module 24 determines whether to insert the audio connector when the charger 4 provides power based on the voltage level of the DET1 pin. At this time, the low-impedance second switch S2 will be turned off.

At the same time, a 5.1K ohm resistor R3 is connected between the DET1 pin and the CC pin (which can be the pin CC2 as illustrated in FIG. 8 or the pin CC1). The accessory Type-C male connector 21 is provided with 56K ohm resistors R4 and R5. The pins CC1 and CC2 of the accessory Type-C male connector 21 are pulled up to the VBUS pin through the fourth switch S4 and the fourth switch S5, which are turned off by default.

The VBUS pin of the accessory Type-C female connector 23 near the charger is connected to the VBUS pin of the accessory Type-C male connector 21 through the third switch S3 with current limiting function. The pins CC1 and CC2 of the Type-C female connector 23 near the charger are respectively pulled down by two 5.1K ohm resistors R1 and R2 to ensure that the charger and the USB Type-C cable are inserted (regardless of positively or inversely inserting). At this time, the accessory can be defined as a USB charged device, so that the VBUS pin of the accessory Type-C female socket 23 can obtain a standard 5V power supply from the charger.

The control module illustrated in FIG. 8 can be composed of some discrete circuits or can be a single-chip system (for example: LDO+MCU) that implements related control functions. The functions are mainly to turn on or off the second switch S2, the third switch S3, the fourth switch S4 and the fourth switch S5. Specifically, the first switch S1 may be, for example, the spring switch of the audio port 22 of the earphone jack, which is usually in an off state (Normally on: N.O.). The action of inserting the earphone will turn on the first switch S1, and then short the DET1 pin and DET2 pin. The second switch S2 can be a normally closed switch (N.C.) or a switch similar to the normally closed switch. Furthermore, when the VBUS pin of the accessory Type-C female socket 23 does not supply power to the audio processing chip 24 through the LDO, the second switch S2 will be turned on when the earphone is inserted so that the DET1 pin and DET2 pin are shorted. Thus, the CC2 pin of the accessory Type-C male connector 21 is pulled down to the ground through a 5.1K ohm resistor, so that the circuit including the audio connector (or understood as earphone)+audio port+audio processing module 24+LDO declares to the electronic device 1 that the circuit is a USB slave device. Thus, the circuit requires the electronic device to provide 5V power output to the VBUS pin of the accessory Type-C male connector 21, so as to implement the interaction between the digital audio signal of the electronic device and the analog audio signal of the analog earphone inserted into the accessory under the power supplying condition.

When the analog earphone connects to the charger and charges the earphone, the VBUS pin of the accessory Type-C female socket 23 of accessory 2 will be powered. At this time, the third switch S3 can be turned on using the control module, the second switch S2 is turned off, and the fourth switch S5 is turned on (or the fourth switch S5 and the fourth switch S4 are turned on). Thus, the charger can supply power to the electronic device and the LDO+audio processing module 24. Pulling up the CC2 pin (turning off the second switch S2 and turning on the fourth switch S5) declares to the electronic device that the charger is inserted (the fourth switch S4, which is turned off by default, can be reserved. The pins CC1 and CC2 of some brands of USB cables (Type A-C) will be pulled up to VBUS through a 56K ohm resistor. The reserved switch S4 adapts to this kind of cable).

If the charger is pulled out, the power supply of VBUS of the accessory Type-C female socket 23 of the accessory 2 will be removed. Then, the control module 25 will lose power, so that the second switch S2 returns to the default conducting state or the ready to conducting state (if the earphone is inserted and the CC2 pin is used, the second switch S2 will be turned on), the third switch S3, the fourth switch S5 and the fourth switch S4 return to the default off state.

The electronic device illustrated in FIG. 8 is a portable device.

The power management module manages to supply power to an external device (e.g., when only the earphone is connected, the electronic device used as a host device supplies power to the accessory) and manages a charger or a quick charger to charge an electronic device. The first switch S6 and the second switch S7 of the switch combination 13 form a two-way single-pole double-throw switch. The two-way single-pole double-throw switch can pass the internal USB2.0 digital signal (D+/D−) of the electronic device and the digital transceiver signal (RXD pin/TXD pin) of the quick charging controller through the DP_T/DP_B pin (that can be short-circuited and named as Dp1 pin) and the DM_T pin/DM_B pin (it can be short-circuited and named as Dm1 pin) of the device Type-C female socket 11 to communicate with an external device in a time-sharing way. For example, the two-way single-pole double-throw switch can be connected to a USB digital earphone or a USB quick charger to perform communication.

The third switch S8 and the fourth switch S9 of the switching combination can form two cross-connect switches or two non-cross-connect switches. Thus, the SBU1 pin is connected to the TXD pin of the quick charging controller 12 and the SBU2 pin is connected to the RXD pin of the quick charging controller 12. Alternatively, the SBU1 pin is connected to the RXD pin of the quick charging controller and the SBU2 pin is connected to the TXD pin of the quick charging controller 12. In addition, the TXD pin and the RXD pin can be also two general-purpose input/output (GPIO) pins or either of a serial data (SDA) pin and a serial clock (SCL) pin of a MCU or an ASIC as the quick charging controller.

In addition, the combination of the third switch S8 and the fourth switch S9 connected to the SBU1 pin and the SBU2 pin can also have the function of detecting impedance through the current source. After the D+ pin and the D− pin of the charger can be connected to the SBU1 and SBU2 pins via the accessory illustrated in FIG. 8, the pull-down resistance of the D+ and D− pins of the charger or the short-circuit state between the D+ and D− pins are detected and determined. As a result, the charger and the charging circuit can make preparations for quick charging protocol before communication happens and ensure that the cross-connectable or non-cross-connected switching action caused by the third switch S8 and the fourth switch S9 accurately matches the correspondence between the TXD and RXD of the MCU/ASIC and the D+ and D− of the charger.

It can be seen that the digital audio and quick charging compatibility of the electronic device with only one USB Type-C port is implemented in cooperation with the internal switching combination and the accessory.

In the foregoing implementation, the system composed of the accessory and the related components of the electronic device creatively respectively connect the SBU1 and SBU2 pins of the device Type-C female socket 11 of the electronic device 1 to the DP_T/DP_B and DM_T/DM_B pins (the two pins are finally connected to the D+ and D-pins of the charger) of the accessory Type-C female socket 23 of the accessory 2. Then, the electronic device such as a smart phone can perform quick charging protocol communication through the SBU1 and SBU2 pins and the D+ and D− pins of the charger. Thus, the matched quick charging charger quickly charges the portable device. In comparison, the very main present quick charging protocols, such as Huawei's SCP/FCP, Oppo's VOOC/Super VOOC and Vivo's private quick charging protocols, perform communication via USB D+/D− pins. In the embodiment, the accessory and the electronic device are quickly charged while audio interaction is implemented.

Please refer to FIG. 9. In another implementation of the embodiment, the quick charging controller is configured to perform quick charging protocol communication through the VBUS pin of the device Type-C female socket 11 and the D+ and D− pins of the charger 4 connected to the accessory 2 when the accessory 2 is connected to the device Type-C female socket 11 and the charger 4 is connected to the accessory 2. The quick charging controller 12 may be directly or indirectly connected to the VBUS pin of the device Type-C female socket 11.

Please refer to FIG. 10. In the implementation, the accessory may further include a modulation module 26. The modulation module 26 is connected to the VBUS pin of the device Type-C male connector 21. When the VBUS pin of the accessory Type-C male connector generates a modulated digital signal, the modulation module 26 is configured to use the modulated digital signal to perform quick charging protocol communication. Besides, the modulation module may be indirectly connected to the D+ and D− pins of the charger.

In an example, the modulation module 26 is connected to the DM pin and the DP pin of the accessory Type-C female socket 23. The DM pin and the DP pin of the accessory Type-C female socket 23 are respectively connected to the D+ pin and the D− pin of the charger.

In another example, the modulation module 26 is connected to the SBU1 pin and the SBU2 pin of the accessory Type-C female socket 23. The SBU1 pin and the SBU2 pin of the accessory Type-C female socket 23 are respectively connected to the D+ pin and the D− pin of the charger.

In the foregoing implementations, the modulated digital signal of the VBUS power pin is used to perform quick charging protocol communication, such that audio interaction and quick charging are implemented.

In an implementation, the digital audio signal mentioned above can be used for audio interaction, and then the audio processing module and its corresponding circuit configuration illustrated in FIG. 7 and FIG. 8 are adopted.

In another embodiment, a circuit configuration uses analog audio signals to perform audio interaction, as illustrated in FIG. 11. The embodiment does not exclude the circuit configuration used in the embodiment of FIG. 1. Correspondingly, in the electronic device 1, an audio encoder 16 connected to the device Type-C female socket via the switch assembly 13 may be arranged.

In cooperation with FIG. 11, the audio interaction of analog audio signals is described as follows:

Like FIG. 8, the audio port can be, for example, a 3.5 mm earphone jack that can support left and right channels R and L. The audio connector can be connected to the RING1 and TIP pins of the earphone jack. The microphone channel MIC is connected to the RING2 pin or SLEEVE pin of the audio port. The audio ground AGND is connected to the SLEEVE pin or RING2 pin of the audio port. The first switch S1, which is a normally on switch between DET1 and DET2, is turned on due to inserting the earphone, thereby pulling down the CC1 and CC2 pins of the accessory Type-C male connector 21 to the ground. As a result, the electronic device 1 such as a smart phone can detect the connection of an analog earphone.

In addition, because the internal circuit of the smart phone can usually detect the positive insertion or reverse insertion and the cross or non-cross switching of the MIC of the analog earphone. Accordingly, it is suitable that the RING2 pin or the SLEEVE pin of the audio port of the 3.5 mm earphone jack is connected to the MIC pin of the audio encoder 16 inside the electronic device (the same is true for AGND).

In addition, like FIG. 8, the DP_T pin of the Type-C male connector is equivalent to the DP_B pin when the male connector is turned 180° (two pins DM_T and DM_B have the same situation). Thus, the DP_T pin is shorted to the DP_B pin (the DP_T and DP_B pins are named as Dp1 in the Type-C specification). The DM_T pin is shorted to the DM_B pin (the DM_T and DM_B pins are named as Dn1 in the Type-C specification). This can ensure that the USB D+ pin and the USB D− pin of the accessory are respectively connected to the USB D+ pin and the USB D− pin of the portable device (or when the D+/D− pin of the multiplexing USB is used for analog audio signals, the D+/D− pin of the multiplexing USB can also accurately correspond to R/L) when the USB Type-C cable or the male connector of the accessory is positively or reversely inserted into the female socket of the electronic device.

Please refer to FIG. 11, the CC1 pin and CC2 pin of the accessory Type C male connector are shorted and then connected to the DET pin (DET pin is connected to the DET1 pin of the earphone interface). The DET2 pin of the audio port is connected to the digital ground GND. There is a normally on switch (N.O.) between the DET1 pin and DET2 pin of the audio port, namely the first switch S1. When the earphone is inserted, the DET1 pin and the DET2 pin can be short-circuited, and the connected CC1 and CC2 pins can be pulled down to GND to notify the electronic device that the analog earphone has been inserted. After the DP_T pin and DP_B pin are shorted to connect to the audio signal R (R connects to the RING1 pin of the earphone interface). The DM_T and DM_B pins are shorted to connect to the audio signal L (L connects to the TIP pin of the earphone interface). The SBU1 and SBU2 pins of the accessory Type-C male connector of the accessory are respectively connected to the MIC/AGND pin (connected to the RING2 pin of the earphone interface) and AGND/MIC pin (connected to the SLEEVE pin of the earphone interface). The VBUS pin of the accessory Type-C male connector 21 is connected to the VBUS pin of the accessory Type C female socket 23 that assists in connecting to the charger. Both the CC1 and CC2 pins of the accessory Type-C female socket 23 are pulled down to the ground through a 5.1K resistor to insert the accessory and connect the male connector of the Type-C cable of the charger. Regardless of positively or reversely inserting the accessory, the CC pin of the cable is pulled down through a 5.1 K resistor, so as to ensure that the small accessory is defined as a USB device that needs power supply. Thus, the charger can output a standard 5V voltage to the VBUS pin of the accessory Type-C female connector 23. Finally, the GND grounds in the accessory are connected.

In the electronic device, the device Type-C female socket 11 is correspondingly connected to the accessory Type-C male connector 23 of the accessory 2. In other words, the device Type-C female socket 11 is electrically connected to the VBUS pin, CC1 pin, CC2 pin, DP_T/DP_B pin, DM_T/DM_B pin, SBU1 pin, SBU 2 pin, and GND pin. Using the voltage received by the VBUS pin of the device Type-C female socket 11, the power management module 15 charges the electronic device. The CC1 pin and the CC2 pin connect to the USB PD and determine whether the analog earphone of the accessory is inserted. The DP_T/DP_B pin and the DM_T/DM_B pin are connected to the audio channels R and L. At the same time, the first switch S6 and the second switch S7 of the switch combination 13 are used as a single-pole double-throw switch that can respectively connect the audio channels R and L of the audio encoder to the DP_T/DP_B pin and DM_T/DM_B pin when the electronic device determines the analog earphone is inserted. Otherwise the DP_T pin/DP_B pin and DM_T pin/DM_B pin can be connected to the D+ pin and D− pin of USB2.0 of the processor. The SBU1 pin and the SBU2 pin are respectively connected to the MIC/AGND pin and AGND/MIC pin of the accessory. The third switch S8 and the fourth switch S9 of the switch combination 13 are used as a single-pole double-throw switch that form two cross-connect switches or two non-cross-connect switches. Thereby, the SBU1 pin is connected to the MIC pin of the audio encoder 16 and the SBU2 pin is connected to the AGND pin of the audio encoder 16. Alternatively, the SBU1 pin is connected to the AGND pin of the audio encoder 16 and the SBU2 pin is connected to the MIC pin of the audio encoder 16. This can ensures that the MIC pin of the analog earphone is accurately connected to the MIC pin of the audio encoder 16 in the electronic device and that the AGND pin of the analog earphone is accurately connected to the AGND pin of the audio encoder 16 in the electronic device. The SBU1 pin and the SBU2 pin have functions for detecting impedances. The function is used to determine whether the AGND pin and the MIC pin of the earphone and the GND pin and the MIC pin of the audio encoder 16 are inversely connected. The digital ground GND of the portable device is directly connected to the digital ground GND of the small accessory on the left.

In conclusion, the present invention provides an electronic device and an accessory with quick charging and audio transmission functions. The electronic device can perform quick charging protocol communication through the SBU pin of the device Type-C female socket and the D+ pin and the D− pin of the charger, which breaks through the usual thought of using the CC pin to perform quick charging protocol communication in the existing quick charging mode. Further, when the accessory with the audio transmission function is used, quick charging can also be performed. In an embodiment, through the interaction of digital audio signals, the required pins can be saved to guarantee the use of the SBU pins for quick charging protocol communication.

In the last, it should be noted that the above embodiments are only used to illustrate the technical solutions of the present invention, not to limit them; although the present invention has been described in detail with reference to the foregoing embodiments, those of ordinary skill in the art should understand that they can still modify the technical solutions described in the foregoing embodiments, or equivalently replace some or all of the technical features; these modifications or replacements do not cause the essence of the corresponding technical solutions to deviate from the scope of the technical solutions of the embodiments of the present invention.

What is claimed is:

1. An electronic device, respectively connected to a charger and an audio connector through an accessory, wherein the electronic device comprises: a quick charging controller and a device Type-C female socket;
   the quick charging controller is configured to perform quick charging protocol communication with a corresponding pin of the charger connected to the accessory through SBU pins of the device Type-C female socket when the accessory is connected to the device Type-C female socket and the charger is connected to the accessory,
   wherein SBU pins of the device Type-C female socket are connected to the quick charging controller through a switching combination, and
   wherein two SBU pins of the device Type-C female socket including a SBU1 pin and a SBU2 pin, the SBU1 pin and the SBU2 pin of the device Type-C female socket are connected to a first side of the switching combination, and a first data pin and a second data pin of the quick charging controller are connected to a second side of the switching combination;
   the switching combination is configured to switch connection mode between the device Type-C female socket and the quick charging controller as follows:
   connect the SBU1 pin of the device Type-C female socket to the first data pin and connect the SBU2 pin of the device Type-C female socket to the second data pin; or
   connect the SBU1 pin of the device Type-C female socket to the second data pin and connect the SBU2 pin of the device Type-C female socket to the first data pin.

2. The electronic device according to claim 1, further comprising a processor; a DP pin and a DM pin of the device Type-C female socket are respectively connected to a DP pin and a DM pin of an accessory Type-C male connector of the accessory when the accessory is connected to the device Type-C female socket;
   the processor is directly or indirectly connected to the DP pin and the DM pin of the device Type-C female socket, the processor uses digital audio signals to interact with the accessory through the DP pin and the DM pin of the device Type-C female socket, and the digital audio signals match analog audio signals that the accessory interacts with the audio connector.

3. The electronic device according to claim 2, wherein a first side of the switching combination is respectively connected to the DP pin and the DM pin of the device Type-C female socket, and a second side of the switching combination is connected to digital signal pins of the processor for receiving USB 2.0 digital signals;
the switching combination is configured to:
switch the DP pin of the device Type-C female socket to connect to the quick charging controller or the processor;
switch the DM pin of the device Type-C female socket to connect to the quick charging controller or the processor.

4. The electronic device according to claim 3, further comprising a power management module connected to a VBUS pin of the device Type-C female socket;
when the accessory is connected to the device Type-C female socket, a CC pin of the device Type-C female socket is connected to a CC pin of an accessory Type-C male connector of the accessory; the CC pin of the device Type-C female socket is connected to a processor, and the processor is configured to determine external connecting states of the accessory according to a signal of a CC pin of the device Type-C female socket; the external connecting states include a first connecting state that the accessory is connected to the audio connector rather than the charger, and a second connecting state that the accessory is connected to the charger;
when the external connecting state is the first connecting state, the processor is configured to command that the power management module provides power for the accessory through a VBUS pin of the device Type-C female socket;
when the external connecting state is the second connecting state, the processor is configured to command that the power management module is charged through a VBUS pin of the device Type-C female socket.

5. The electronic device according to claim 2, further comprising a power management module connected to a VBUS pin of the device Type-C female socket;
when the accessory is connected to the device Type-C female socket, a CC pin of the device Type-C female socket is connected to a CC pin of an accessory Type-C male connector of the accessory; the CC pin of the device Type-C female socket is connected to a processor, and the processor is configured to determine external connecting states of the accessory according to a signal of a CC pin of the device Type-C female socket; the external connecting states include a first connecting state that the accessory is connected to the audio connector rather than the charger, and a second connecting state that the accessory is connected to the charger;
when the external connecting state is the first connecting state, the processor is configured to command that the power management module provides power for the accessory through a VBUS pin of the device Type-C female socket;
when the external connecting state is the second connecting state, the processor is configured to command that the power management module is charged through a VBUS pin of the device Type-C female socket.

6. The electronic device according to claim 1, further comprising a current source and a voltage detection module, and the current source is connected to a SBU pin of the device Type-C female socket through the switching combination and configured to output an output current to the SBU pin;
the voltage detection module is directly or indirectly connected to SBU pins of the device Type-C female socket, and the voltage detection module detects voltage information across the SBU pins to determine impedances of SBU pins of the device Type-C female socket based on the voltage information.

7. The electronic device according to claim 6, further comprising a power management module connected to a VBUS pin of the device Type-C female socket;
when the accessory is connected to the device Type-C female socket, a CC pin of the device Type-C female socket is connected to a CC pin of an accessory Type-C male connector of the accessory; the CC pin of the device Type-C female socket is connected to a processor, and the processor is configured to determine external connecting states of the accessory according to a signal of a CC pin of the device Type-C female socket; the external connecting states include a first connecting state that the accessory is connected to the audio connector rather than the charger, and a second connecting state that the accessory is connected to the charger;
when the external connecting state is the first connecting state, the processor is configured to command that the power management module provides power for the accessory through a VBUS pin of the device Type-C female socket;
when the external connecting state is the second connecting state, the processor is configured to command that the power management module is charged through a VBUS pin of the device Type-C female socket.

8. The electronic device according to claim 1, further comprising a power management module connected to a VBUS pin of the device Type-C female socket;
when the accessory is connected to the device Type-C female socket, a CC pin of the device Type-C female socket is connected to a CC pin of an accessory Type-C male connector of the accessory; the CC pin of the device Type-C female socket is connected to a processor, and the processor is configured to determine external connecting states of the accessory according to a signal of a CC pin of the device Type-C female socket; the external connecting states include a first connecting state that the accessory is connected to the audio connector rather than the charger, and a second connecting state that the accessory is connected to the charger;
when the external connecting state is the first connecting state, the processor is configured to command that the power management module provides power for the accessory through a VBUS pin of the device Type-C female socket;
when the external connecting state is the second connecting state, the processor is configured to command that the power management module is charged through a VBUS pin of the device Type-C female socket.

9. An accessory with quick charging and audio transmission functions, comprising an accessory Type-C female socket connected to a charger, an accessory Type-C male connector, and an audio port connected to an audio connector, and the accessory Type-C male connector is connected to the device Type-C female socket of the electronic device according to claim 1.

10. The accessory according to claim 9, wherein SBU pins of the accessory Type-C male connector include a SBU1 pin and a SBU2 pin;
the SBU1 pin and the SBU2 pin of the accessory Type-C male connector are respectively connected to a DP pin and a DM pin of the accessory Type-C female socket, and when the charger is connected to the accessory Type-C female socket, a DP pin and a DM pin of the accessory Type-C female socket are respectively connected to a D+ pin and a D− pin of the charger; or
the SBU1 pin and the SBU2 pin of the accessory Type-C male connector are respectively connected to a SBU1 pin and a SBU2 pin of the accessory Type-C female socket, and when the charger is connected to the accessory Type-C female socket, a SBU1 pin and a SBU2 pin of the accessory Type-C female socket are respectively connected to a SBU1 pin and a SBU2 pin of the charger.

11. The accessory according to claim 10, further comprising an audio processing module with three signal transmission pins thereof respectively connected to a left channel, a right channel, and a microphone pin of the audio port, and the audio processing module is connected to a DP pin and a DM pin of the accessory Type-C male connector;
the audio processing module is configured to:
use digital audio signals to interact with the connected electronic device through a DP pin and a DM pin of the accessory Type-C male connector;
use analog audio signals to interact with the audio connector through the three signal transmission pins; and
perform a conversion between the digital audio signal and the analog audio signal.

12. The accessory according to claim 9, further comprising an audio processing module with three signal transmission pins thereof respectively connected to a left channel, a right channel, and a microphone pin of the audio port, and the audio processing module is connected to a DP pin and a DM pin of the accessory Type-C male connector;
the audio processing module is configured to:
use digital audio signals to interact with the connected electronic device through a DP pin and a DM pin of the accessory Type-C male connector;
use analog audio signals to interact with the audio connector through the three signal transmission pins; and
perform a conversion between the digital audio signal and the analog audio signal.

13. The accessory according to claim 12, wherein a first detection pin and a second detection pin of the audio processing module are connected to the audio port, the first detection pin is shorted to the second detection pin when the audio connector is completely connected to the audio port, and the first detection pin is connected to a CC pin of the accessory Type-C male connector;
when the audio connector is completely connected to the audio port but the charger is not connected to the accessory Type-C female socket, the first detection pin is shorted to the second detection pin and a voltage level of a CC pin of the accessory Type-C male connector is pulled to a first voltage level, which commands that the electronic device connected to the accessory directly or indirectly provides power for the audio processing module;
when the charger is connected to the accessory Type-C female socket, the audio processing module is charged by the charger.

14. The accessory according to claim 13, further comprising a control module with a power supplying pin thereof connected to a VBUS pin of the accessory Type-C female socket, and the control module is charged by the charger when the charger is connected to the accessory Type-C female socket;
when the charger is connected to the accessory Type-C female socket, the control module is configured to pull a voltage of a CC pin of the accessory Type-C male connector to a second voltage level, which commands that the electronic device connected to the accessory is charged through a VBUS pin of the electronic device.

15. The accessory according to claim 14, further comprising a first switch, a second switch, a third switch, a fourth switch, and a low dropout regulator;
the first switch is connected between the first detection pin and the second detection pin, the first switch is turned on when the audio connector is completely connected to the audio port, the second switch is connected between the second detection pin and a ground and connected to a resistor unit in parallel, the third switch is connected between VBUS pins of the accessory Type-C female socket and the accessory Type-C male connector, a CC pin of the accessory Type-C male connector is connected to a VBUS pin of the accessory Type-C male connector through the fourth switch and a resistor unit, and a VBUS pin of the accessory Type-C male connector provides power for the audio processing module through the low dropout regulator;
when a voltage of a CC pin of the accessory Type-C male connector is pulled to a second voltage level, the control module is configured to turn off the second switch and turn on the third switch and the fourth switch.

16. The accessory according to claim 9, wherein SBU pins of the device Type-C female socket are connected to the quick charging controller through a switching combination.

* * * * *